UNITED STATES PATENT OFFICE.

CARLETON ELLIS, OF LARCHMONT, NEW YORK, ASSIGNOR TO CHADELOID CHEMICAL COMPANY, OF NEW YORK, N. Y., A CORPORATION OF WEST VIRGINIA.

FINISH-REMOVE.

No. 876,532.  Specification of Letters Patent.  Patented Jan. 14, 1908.

Application filed July 23, 1907. Serial No. 385,177.

*To all whom it may concern:*

Be it known that I, CARLETON ELLIS, a citizen of the United States, and resident of Larchmont, in the county of Westchester and State of New York, have invented certain new and useful Improvements in Finish-Removers, of which the following is a specification.

This invention relates to paint and varnish removers comprising organic finish solvents carrying an inorganic compound in a state or condition whereby retardation of evaporation of the finish solvent is attained, and when desired a suitable thickening of the composition secured.

Many of the halogen compounds of antimony and some of these of arsenic, tin, lead and the like dissolve in volatile organic solvents, and afford slowly evaporating compositions of some degree of consistency which have valuable paint and varnish removing properties. Among such compounds may be mentioned the chlorids of antimony, particularly the trichlorid or butter of antimony, which is soluble in volatile solvents such as alcohol; antimonyl chlorid, a compound little soluble in alcohol, ether and acetone, but somewhat soluble in chlorids of carbon, carbon bisulfid, benzol and the like; antimony oxychlorid of the formula $SbOCl_3$ and various other oxychlorids of both antimonic and antimonous antimony of differing degrees of solubility in these and similar organic volatile solvents; similarly with the bromids and iodids. Some sulfochlorids are also fairly soluble in hydrocarbon solvents. Various double salts may be formed from these bodies giving rise to compounds of a more or less acid, or even neutral nature. Calcium and magnesium chlorid are examples of salts capable of forming double salts with the above mentioned compounds. Ammonia combines rather freely with these antimony compounds giving useful bodies. Sulfur is soluble in carbon bisulfid, but insoluble in alcohol.

My improved composition is prepared by dissolving (by the aid of heat if necessary) the inorganic compound in the solvent or solvents. The latter are essentially volatile and comprise such bodies as benzol and its homologues, referred to as benzolic solvent material, petroleum hydrocarbons, such as benzin, resin spirits, carbon bisulfid, carbon tetrachlorid, acetylene tetrachlorid, chloroform, chlorids of benzol and other aromatic bodies, various alcohols as wood, grain, denatured, amyl alcohol and the like, also acetone, methyl ethyl ketone and analogous bodies, wood turpentine, oil of turpentine, oil of acetone, etc. Alcoholic chlorids, acetic acid, and similar volatile solvents have a desirable blending action.

A removing composition may be prepared by dissolving pure antimonyl chlorid, $SbCOl$, in benzol and adding wood alcohol thereto.

A suitable composition may be prepared by warming four parts of denatured alcohol saturated with ammonia gas with one part of butter of antimony. Five parts of wood alcohol or acetone, one half part of concentrated ammonium hydro-oxid and one part of butter of antimony, mixed in the order mentioned afford a remover effective on sandarac varnish. Butter of antimony has the property of rendering alcoholic bodies immiscible with benzol and similar hydrocarbons, thus affording the means for the preparation of emulsions of benzol and alcohol. By suitably thickening the benzol permanent emulsions may be prepared. A curious property of butter of antimony is its action on waste cellulose sulfite liquor. A liquor of 30 Baumé is insoluble in wood alcohol, etc., but the addition of a small amount of butter of antimony brings the liquor into solution. A mixture by volume of five parts of wood alcohol, three parts of butter of antimony and two parts of sulfite liquor has the power of dissolving considerable benzol. In the preparation of alcoholic removers containing butter of antimony it is often desirable to have present from five to ten per cent. of water as the oxychlorinated compound formed has considerable evaporation retarding action. The consistency is varied by increasing, or decreasing the amount of the chlorid; also by varying the proportion of alcohol. A very small quantity of alcohol makes a stripping remover which softens the finish just sufficiently so that it may be removed in large films or sheets.

For removing resin varnish from one half to one pound of the chlorid may be dissolved in one gallon of benzol, without the addition of alcohol.

By heating butter of antimony under pressure in slightly diluted alcoholic solution an oxy compound is formed, having a lesser degree of solubility, and resulting in a thickening of the alcohol to make a useful remover for shellac and the like. Some alcoholic chlorid is formed at the same time and possesses a desirable solvent action.

To recapitulate, my invention consists in a composition comprising volatile finish solvents, as for instance alcoholic or hydrocarbon bodies, or both combined, or other single or composite finish solvent and an evaporation restraining inorganic bodies, preferably of an oily or waxy nature, and soluble more or less in one or more of the solvents employed, the latter being either in miscible solution or in an emulsified form; said inorganic bodies being preferably capable of acting not only as an evaporation retardent, but also as a thickener, and preferably being present in solution in a state of supersaturation, or in a quasi-dissolved or gelatinous condition; and in the process of preparation of said composition by solution and gelatinization or precipitation of an organic body in suitable volatile finish solvents, whereby a slowly evaporating composition results.

What I claim is:

1. The composition for removing finish consisting of antimonyl chlorid, benzol and wood alcohol.

2. The composition for removing finish consisting of benzol, wood alcohol and a chlorinated compound of antimony soluble in benzol.

3. The composition for removing finish comprising benzol, alcohol and a chlorinated compound of a heavy metal soluble in benzol.

4. The composition for removing finish comprising an alcohol, benzol and a chlorinated compound of antimony soluble therein.

5. The composition for removing finish comprising finish solvent material, including an alcohol and a benzolic solvent, and a chlorinated compound of antimony soluble therein.

Signed at New York in the county of New York and State of New York this 22nd day of July A. D. 1907.

CARLETON ELLIS.

Witnesses:
JOHN C. FLOAN,
ANNETTE BEECHING.